United States Patent [19]
Ohoka et al.

[11] Patent Number: 5,105,319
[45] Date of Patent: Apr. 14, 1992

[54] MAGNETIC RECORDING/REPRODUCING APPARATUS IN WHICH TAPE CASSETTES OF DIFFERENT SIZES CAN BE MOUNTED

[75] Inventors: Satoshi Ohoka, Yokohama; Seiji Tomita, Yokosuka, both of Japan

[73] Assignee: Kabushiki Kaisha Toshiba, Kawasaki, Japan

[21] Appl. No.: 528,100

[22] Filed: May 24, 1990

[30] Foreign Application Priority Data

May 25, 1989 [JP] Japan .................. 1-131851

[51] Int. Cl.$^5$ .............................................. G11B 15/66
[52] U.S. Cl. ................................ 360/94; 360/96.5; 360/132
[58] Field of Search ................ 360/94, 132, 96.5

[56] References Cited

U.S. PATENT DOCUMENTS

| | | | |
|---|---|---|---|
| 4,476,505 | 10/1984 | Ogata et al. | 360/94 |
| 4,490,757 | 12/1984 | Mogi | 360/94 |
| 4,544,970 | 10/1985 | Ogata | 360/94 |
| 4,567,536 | 1/1986 | Tsuchiya | 360/94 |
| 4,602,300 | 7/1986 | Ogata et al. | 360/96.5 X |
| 4,664,337 | 5/1987 | Shiratori | 242/199 |
| 4,903,149 | 2/1990 | Hasegawa et al. | 360/94 X |

FOREIGN PATENT DOCUMENTS

| | | |
|---|---|---|
| 63-191347 | 8/1988 | Japan . |
| 63-191348 | 8/1988 | Japan . |
| 655195 | 12/1978 | Switzerland . |
| 2089317 | 6/1982 | United Kingdom ........... 360/94 |

OTHER PUBLICATIONS

Patent Abstracts of Japan, vol. 7 No. 172, Jul. 29, 1983.
Patent Abstracts of Japan, vol. 11, No. 118, Apr. 14, 1987.
Patent Abstracts of Japan vol. 9, No. 243, Sep. 30, 1985.
Patent Abstracts of Japan vol. 8, No. 86, Apr. 19, 1984.

*Primary Examiner*—John H. Wolff
*Attorney, Agent, or Firm*—Cushman, Darby & Cushman

[57] ABSTRACT

A feed reel and a take-up reel of a full-size cassette are mounted directly on a feed reel table and a take-up reel table which constitute a tape running system. A feed reel of a C-cassette (compact cassette) is mounted directly on the feed reel table, while a take-up reel of the C-cassette receives a driving force transmitted from the take-up reel table through a torque transmitting mechanism. The full-size cassette is driven directly by the feed and take-up reel tables in the state wherein the tape is loaded by a tape loading member, so that a tape of the full-size cassette is run. On the other hand, in the state wherein a tape in the C-cassette is loaded by the tape loading member, the C-cassette is driven such that the feed reel of the C-cassette is rotated by the feed reel table while the take-up reel of the C-cassette receives a driving force from the take-up reel table 14 through the torque transmitting mechanism. Thus, the tape in the C-cassette is run.

8 Claims, 3 Drawing Sheets

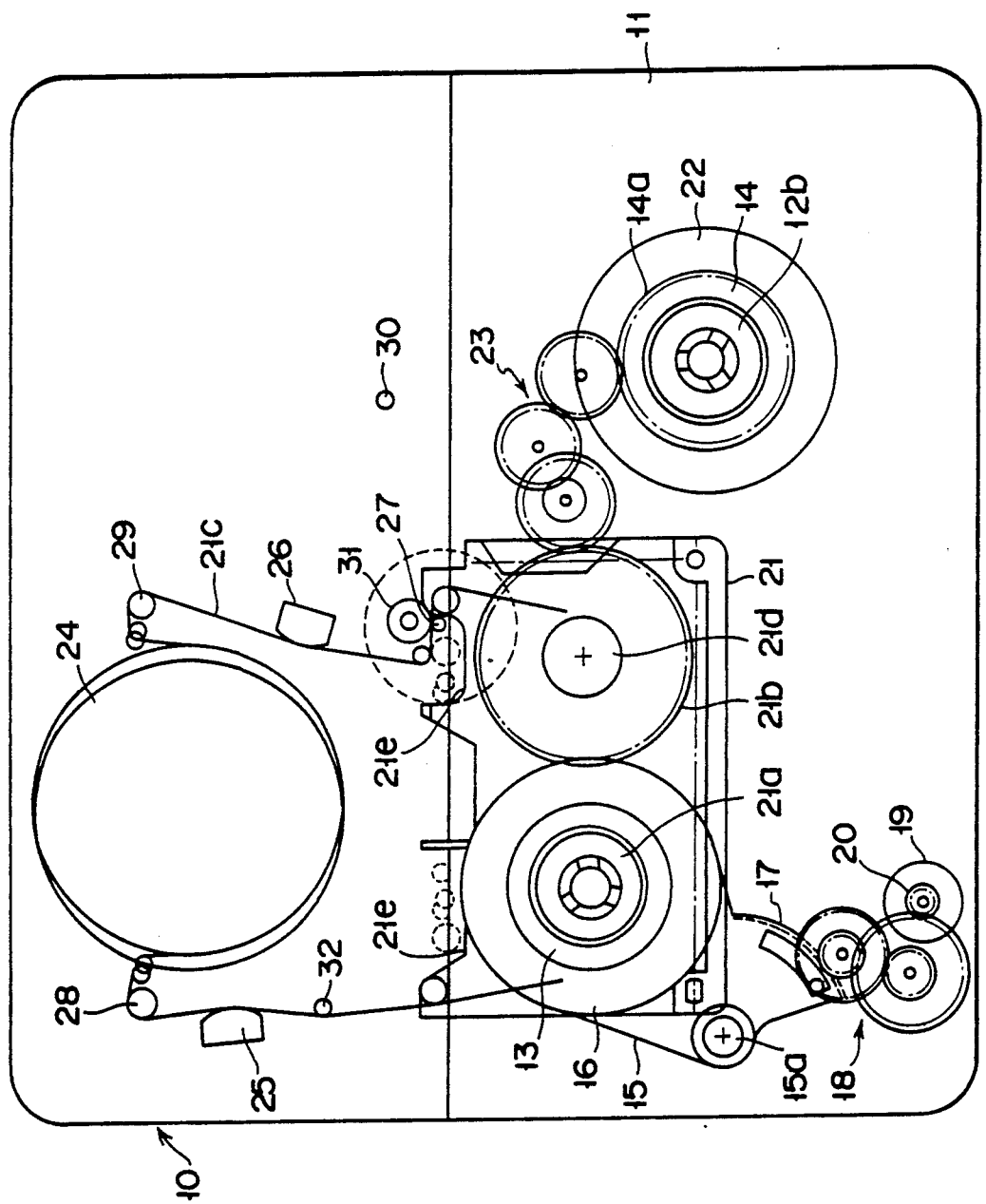

MAGNETIC RECORDING/REPRODUCING APPARATUS IN WHICH TAPE CASSETTES OF DIFFERENT SIZES CAN BE MOUNTED

BACKGROUND OF THE INVENTION

1. Field of the Invention

The present invention relates generally to a magnetic recording/reproducing apparatus, such as a VHS-type video tape recorder (VTR), and more particularly to a magnetic recording/reproducing apparatus in which tape cassettes of different sizes, e.g. a VHS full-size cassette size a VHS compact cassette (C-cassette), can be loaded.

2. Description of the Related Art

There are conventional VTRs which are designed such that recording mediums of different sizes, i.e. a full-size cassette and a C-cassette having different sizes, can be loaded. In this case, a magnetic tape in these cassettes is passed between a feed reel and a take-up reel. When the full-size cassette is loaded, the full-size cassette is first inserted into a cabinet. Upon the insertion of the cassette, a cassette loading mechanism is operated, and the cassette is moved by a holder of the cassette loading mechanism to the location of a tape drive unit. Thus, the full-size cassette is loaded. When the C-cassette, in place of the full-size cassette, is loaded, the C-cassette is first contained in a separate C-cassette adapter and then the adapter is inserted into the cabinet. Upon the insertion, the C-cassette adapter is moved by the holder of the cassette loading mechanism to the tape drive unit. Thus, the C-cassette is loaded in the tape drive unit.

In these conventional VTRs, it is necessary to contain the C-cassette in the adapter each time it is loaded in place of the full-size cassette. It is thus troublesome to load the C-cassette after the full-size cassette.

Recently, there has been a considerable demand for a VTR wherein both full-size cassettes and C-cassettes can be smoothly loaded without using a separate C-cassette adapter.

SUMMARY OF THE INVENTION

The object of the present invention is to provide a magnetic recording/reproducing apparatus wherein tapes in tape cassettes having different sizes can be loaded with a simple structure and with high operability.

This object of the invention is achieved by a magnetic recording/reproducing apparatus wherein one of first and second tape cassettes having different sizes is loaded and a magnetic tape in said one of tape cassettes is passed between a feed reel and a take-up reel of said one of the tape cassettes, said apparatus comprising: a pair of a feed reel table and a take-up reel table, both being rotatable, a feed reel of one of first and second tape cassettes being mounted on said feed reel table, and a take-up reel of said first tape cassette having a greater size than that of the second tape cassette being mounted on said take-up reel table; a torque transmitting mechanism for transmitting a torque of said take-up reel table to a take-up reel of said second tape cassette, in the state wherein the feed reel of said second tape cassette is mounted on said feed reel table; and a tape loading member, driven in the state wherein one of said first and second tape cassettes is loaded, for pulling the tape of said one of tape cassettes and passing the tape over a tape drive unit.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a plan view showing the state wherein a C-cassette has been loaded.

DETAILED DESCRIPTION OF THE PREFERRED EMBODIMENTS

An embodiment of the present invention will now be described with reference to the accompanying drawings.

Figure 1:
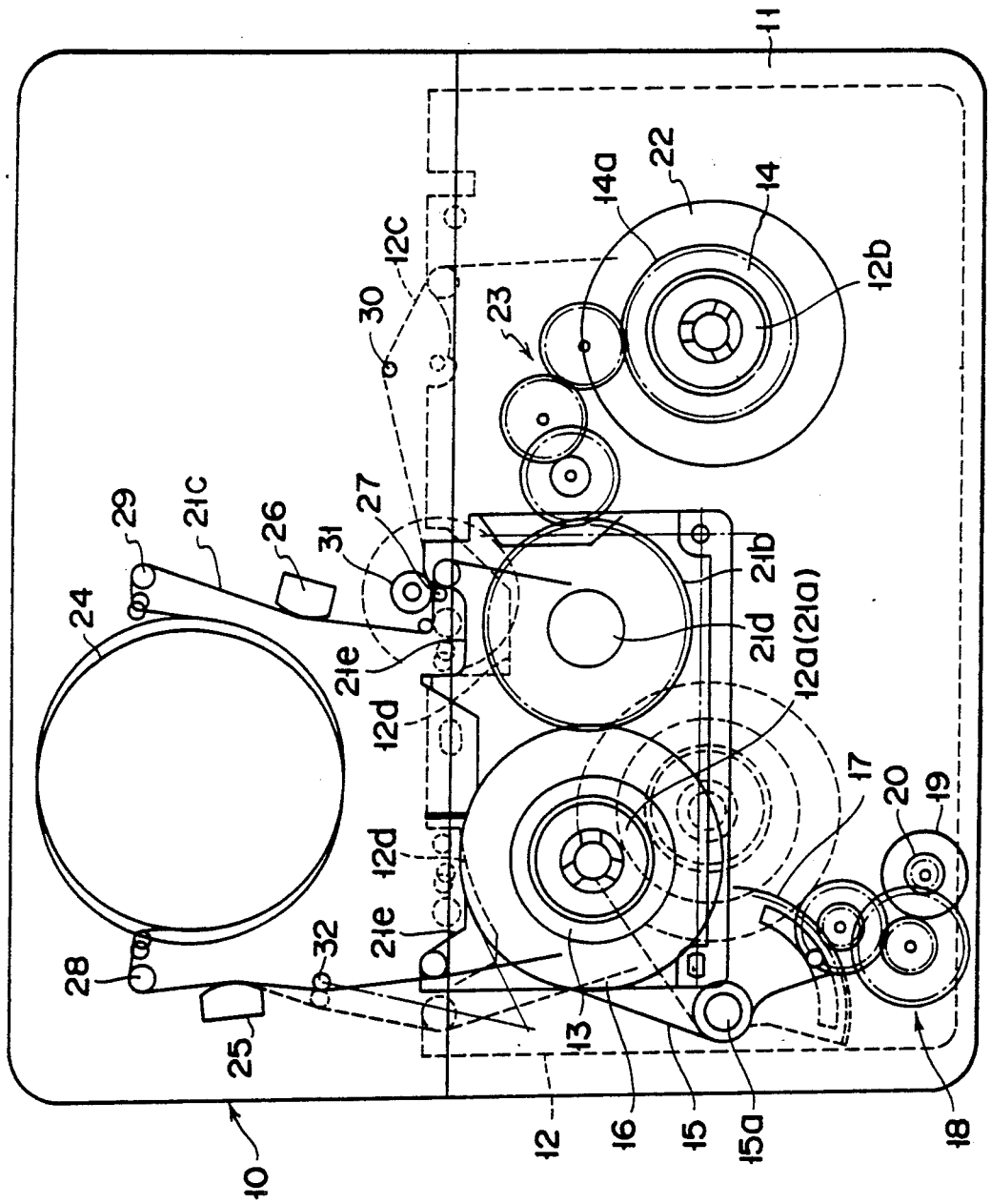
FIG. 1 is a plan view showing a magnetic recording-/reproducing apparatus according to an embodiment of the present invention.

FIG. 1 shows a magnetic recording/reproducing apparatus according to an embodiment of this invention. A main chassis 10 has a cassette container 11 on one side thereof. A feed reel table 13 and a take-up reel table 14 of a tape run system are arranged with a predetermined distance therebetween in the cassette container 11. A feed reel 12a and a take-up reel 12b of a first tape cassette 12 (e.g. a VHS full-size cassette, indicated by a broken line) are mounted on the tables 13 and 14. The feed reel table 13 is brought into contact with a distal end portion of a movable arm 15. A base part of the feed reel table 13 is attached to a drive shaft of a direct-coupled motor 16. A shaft 15a is rotatably supported by a proximal end portion of the movable arm 15. A gear portion section 17 is arranged in the vicinity of the shaft 15a. One end portion of a gear motion transmitting mechanism 18 or a torque transmitting mechanism is meshed with the gear portion 17, and the other end portion of the mechanism 18 is meshed with a drive gear 20. The drive gear 20 is engaged with a drive shaft of a drive motor 19. The movable arm 15 is driven by means of the motor 19 via the drive gear 20 and the gear motion transmitting mechanism 18. In interlock with the motion of the arm 15, the feed reel table 13 is moved between a first position (indicated by a broken line in FIG. 1) where the feed reel 12a of the full-size cassette 12 is to be located, and a second position (indicated by a solid line in FIG. 1) where a feed reel 21a of a second tape cassette 21 (e.g. a VHSC-cassette, indicated by a solid line) is to be located.

On the other hand, a base part of the take-up reel table 14 is coupled to a direct-coupled motor 22. A gear portion 14a is formed on the periphery of the take-up reel table 14. One end portion of a gear motion transmitting mechanism 23 or a torque transmitting mechanism is meshed with the gear portion 14a. The other end portion of the mechanism 23 is removably meshed with a take-up gear 21b attached to a take-up reel 21d of the C-cassette 21. Consequently, the torque of the take-up reel table 14 is transmitted, alternatively, to the take-up gear 21b of the C-cassette 21, thereby rotating the take-up reel 21d.

The main chassis 10 has a cylinder 24 functioning as a tape drive mechanism. An erase head 25, a voice control head 26, and a capstan 27 ar arranged to face the cylinder 24. The main chassis 10 is also provided with an entrance-side post member 28 and an exit side post member 29 which constitute a tape loading mechanism. The post members 28 and 29 are movable between a loading start position and a loading end position. In the loading start position, the post members 28 and 29 are situated in recesses 21e of each of the full-size cassette 12 and the C-cassette 21. In the loading end position, the post members 28 and 29 are situated on both sides of the cylinder 24. A guide member 30 is movably arranged on the chassis 10 so as to face the take-up reel 12b of the full-size cassette 12. The entrance-side post member 28 and exit-side post member 29 are driven by a tape loading drive unit (not shown) to the loading end position in which a tape 12c (21c) of the full-size cassette 12 (or C-cassette 21) is pulled and set onto the cylinder 24. When the tape loading drive unit is operated in the reverse direction, the tape 12c (21c) is restored to the loading start position in which the tape 12c (21c) is contained in the cassette 22 (21). The guide member 30 is driven, along with the entrance-side post member 28 and the exit-side post member 29, by means of the tape loading drive unit. The guide member 30 sets the tape 12c of the full-size cassette 12 to a predetermined position.

A pinch roller 31 is rotatably attached to the chassis 10. The pinch roller 31 is moved in interlock with a pinch lever (not shown) driven by the tape loading drive unit, thereby clamping the tape 12c (21c) between itself and the capstan 27.

A tension applying post 32 is moved in interlock with the tape loading drive unit, thereby applying a suitable tension to the tape 12c (21c).

Figure 2:
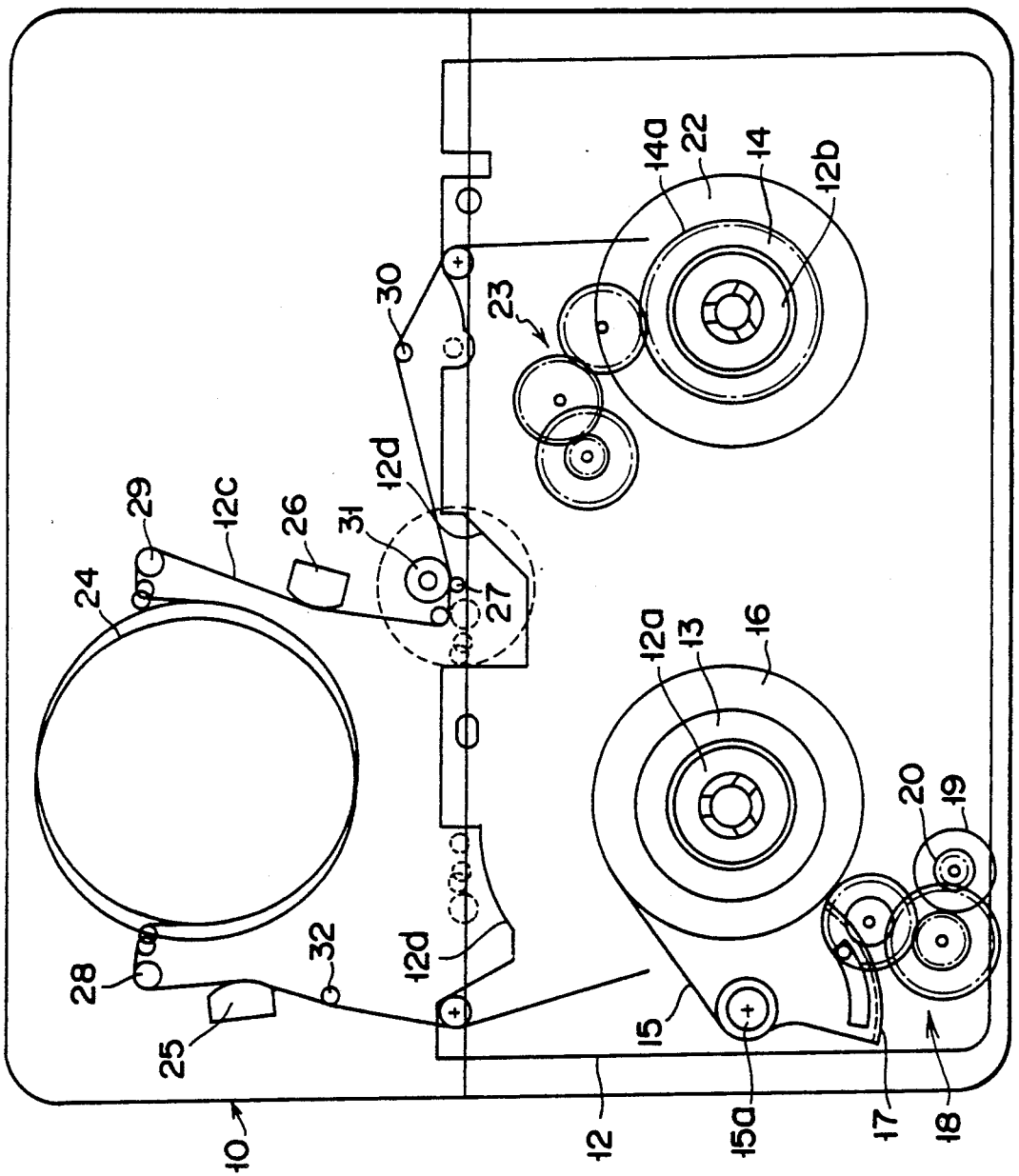
FIG. 2 is a plan view showing the state wherein a full-size cassette has been loaded.

FIG. 2 shows the state wherein the full-size cassette 12 has been loaded in the cassette container 11. When the cassette 12 is loaded, the motor 19 is first actuated to shift the feed reel table 13 to the first position in the clockwise direction via the gear motion transmitting mechanism 18 and the movable arm 15. Thus, the cassette container 11 is set in the state for loading the full-size cassette. In this state, when the full-size cassette 12 is mounted on the feed reel table 13 and the take-up reel table 14, its recesses 12d contain the capstan 27, entrance-side post member 28, exit-side post member 29, and tension applying post 32. The post members 28 and 29, the pinch roller 31, and the tension applying post 32 are moved by the tape loading drive unit so as to pull the tape 12c and pass it over the cylinder 24. The motors 16 and 22 coupled to the feed reel table 13 and take-up reel table 14 are driven in accordance with a selected operation mode, and the tape in the full-size cassette 12c is run.

When the tape loading drive unit is actuated in the reverse direction, the post members 28 and 29, the pinch roller 31, and the tension applying post 32 are shifted to the loading start position. Also, the reel tables 13 and 14 are rotated by the motors 16 and 22. Thus, the tape 12c passed over the cylinder 24 is restored in the cassette 12.

FIG. 3 shows the state wherein the C-cassette 21 has been loaded in the cassette container 11. When the C-cassette 21 is loaded, the motor 19 is first driven to shift the feed reel table 13 to the second position in the counterclockwise direction via the gear motion transmitting mechanism 18 and the movable arm 15. Thus, the cassette container 11 is set in the state for loading the C-cassette. In this state, the feed reel 21a of the C-cassette 21 is mounted on the feed reel table 13. The take-up gear 21b of C-cassette 21 is meshed with the gear 14a of the take-up reel table 14 via the gear motion transmitting mechanism 23. At the same time, the recesses 21e of the C-cassette 21 contain the capstan 26, entrance-side post member 28, exit-side post member 29, and tension applying post 32. The post members 28 and 29, the pinch roller 31, and the tension applying post 32 are moved by the tape loading drive unit so as to pull the cape 21c and pass it over the cylinder 24. The motors 16 and 22 coupled to the feed reel table 13 and take-up reel table 14 are driven in accordance with a selected operation mode, and the tape in the C-cassette 21 is run. In this case, the feed reel 21a is driven directly by the feed reel table 13, while the take-up reel 21d is driven via the gear motion transmitting mechanism 23. Namely, the torque of the take-up reel table 14 is transmitted to the take-up gear 21b of the take-up reel 21d via the gear motion transmitting mechanism 23.

When the tape loading drive unit is actuated in the reverse direction, the post members 28 and 29, the pinch roller 31, and the tension applying post 32 are shifted to the loading start position. Also, the reel tables 13 and 14 are rotated by the motors 16 and 22. The feed reel 21a of the C-cassette 21 is driven directly by the feed reel table 13, while the take-up reel 21d is driven via the gear motion transmitting mechanism 23. The torque of the take-up reel table 14 is transmitted to the take-up gear 21b of the take-up reel 21d via the gear motion transmitting mechanism 28. Thus, the tape 12c passed over the cylinder 24 is restored in the cassette 12.

According to the above-described recording/reproducing apparatus, the feed reel 12a and take-up reel 12b of the full-size cassette 12 are mounted on the feed reel table 13 and take-up reel table 14, and the tape of the full-size cassette 12 is run. On other hand, the feed reel 21a of the C-cassette 21 is mounted on the feed reel table 13, and the torque of the take-up reel table 14 is transmitted to the take-up reel 21d via the gear motion transmitting mechanism 23. Thus, the tape of the C-cassette 21 is run. The tape of the C-cassette 21 can be run without any adapter by using the feed reel table 13 and the take-up reel table 14 which are used to run the tape of the full-size cassette 12. Namely, both the full-size cassette 12 and the C-cassette 21 can be set in the VTR without using the C-cassette adapter, and the troublesome procedure of setting the C-cassette can be avoided.

In this apparatus, the feed reel table 13 is movable between the first position where the feed reel 12a of the full-size cassette 12 is mounted and the second position where the feed reel 21a of the C-cassette 21 is mounted. Further, the gear motion transmitting mechanism 23 is provided for transmitting the torque of the take-up reel table 14 to the take-up reel 21d of the C-cassette 21. In the state wherein the feed reel table 13 is situated in the first position, the full-size cassette 12 can be mounted. On the other hand, in the state wherein it is situated in the second position, the feed reel 21a of the C-cassette 21 is rotated along with the table 13, and the take-up gear 21b of the take-up reel 21d is rotated by means of the gear motion transmitting mechanism 23. By virtue of this structure, the full-size cassette 12 and the C-cassette 21, having different sizes, can be loaded, without using the separate C-cassette adapter which is needed in the conventional art. Therefore, the handling of the cassettes is made easier.

Additional advantages and modifications will readily occur to those skilled in the art. Therefore, the invention in its broader aspects is not limited to the specific details, and representative apparatus shown and described herein. Accordingly, various modifications may by without departing from the spirit or scope of the general inventive concept as defined by the appended claims and their equivalents.

What is claimed is:

1. A magnetic recording/reproducing apparatus for loading tape cassettes of magnetic tape, said cassettes having either a first size or a smaller second size, and moving said magnetic tape between a feed reel and a take-up reel of said tape cassettes, said apparatus comprising:
   a feed reel table and a take-up reel table, each of said tables being rotatable, but only said feed reel table being moveable between a first position for said tape cassettes of said first size and a second position for said tape cassettes of said second size, said feed reel table receiving said feed reel of said tape cassettes of either said first size or said second size, said take-up reel table receiving said take-up reel of tape cassettes only of said first size;
   feed reel table moving means for moving said feed reel table to said first position for said tape cassette of said first size and to said second position for said tape cassette of said second size;
   torque transmitting means for transmitting a torque of said take-up reel table to a take-up reel of said tape cassette of said second size when said tape cassettes of said second size are mounted on said feed reel table; and
   tape loading means, actuated whenever said tape cassettes are loaded, for pulling the tape of said tape cassettes and passing the tape over a tape drive unit.

2. The apparatus according to claim 1, wherein said torque transmitting means is a gear transmission mechanism.

3. The apparatus according to claim 1 wherein said tape loading means takes a common position when the tape loading means starts pulling the tape whether the tape is the first size or the second size.

4. A tape cassette loading apparatus for loading tape cassettes of at least two sizes, said at least two sizes being distinct from each other, each of said tape cassettes having a tape passed between a feed reel and a take-up reel, said apparatus comprising:
   a feed reel table having a feed reel table center axis, said feed reel table being rotatable about said feed reel table center axis, said feed reel table also being rotatable about a pivot axis parallel to but distinct from said feed reel table center axis; and
   a take-up reel table having a take-up reel table center axis, said take-up reel table being rotatable about said take-up reel table center axis, said take-up reel table having a fixed position within said tape cassette loading apparatus.

5. The tape cassette loading apparatus of claim 4, further comprising:
   a feed reel table motor coupled to said feed reel table for causing said feed reel table to rotate about said feed reel table center axis.

6. The tape cassette loading apparatus of claim 4, further comprising:
   a take-up reel table motor coupled to said take-up reel table for causing said take-up reel table to rotate about said take-up reel table center axis.

7. The tape cassette loading apparatus of claim 4, further comprising:
   means for selectively positioning said feed reel table in one of at least two positions about said pivot axis.

8. The tape cassette loading apparatus of claim 4, further comprising:
   means operatively coupled to said take-up reel motor for imparting motion to a take-up reel of a cassette loaded in said tape cassette loading apparatus when said feed reel table is in at least one of said at least two positions and said take-up reel is not disposed on said take-up reel table.

* * * * *